Mar. 27, 1923.
C. LUTHER ET AL.
ENGINE COOLING FAN.
FILED FEB. 18, 1922.
1,449,685.
2 SHEETS—SHEET 2.
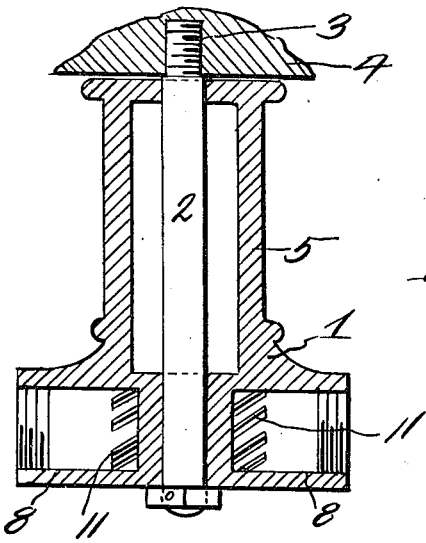
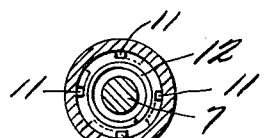
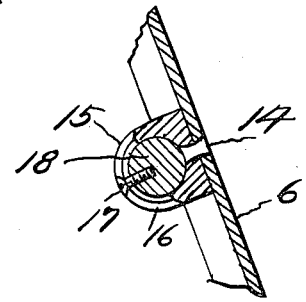
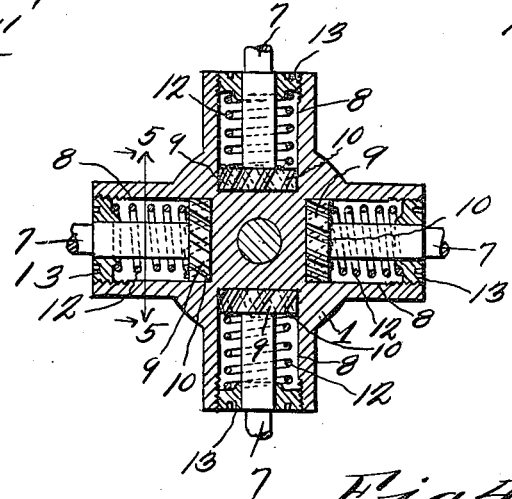
Inventors
Carl Luther
Henry Moeller
By Philip A. H. Serrell
Attorney Patented Mar. 27, 1923.

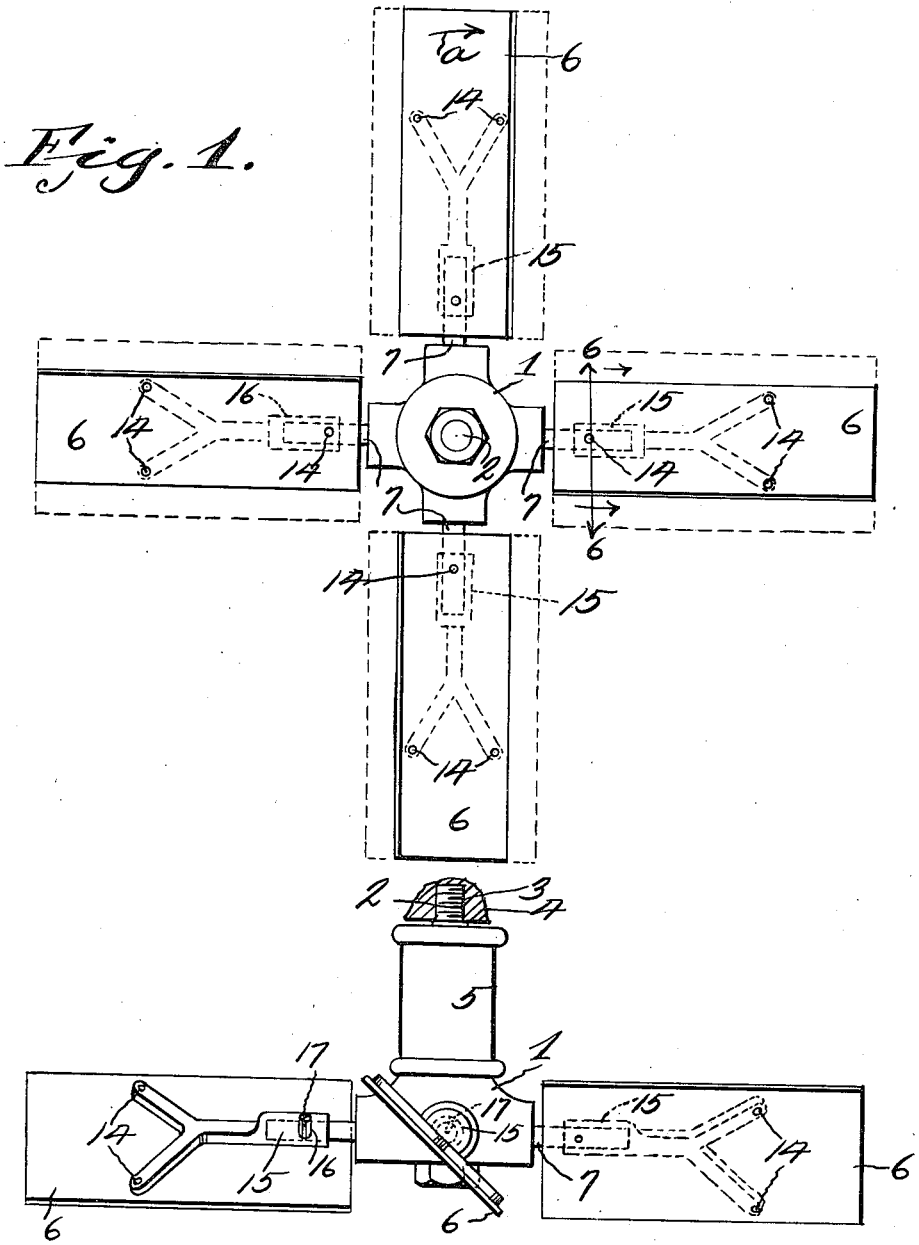

1,449,685

UNITED STATES PATENT OFFICE.

CARL LUTHER AND HENRY MOELLER, OF COUNCIL BLUFFS, IOWA.

ENGINE-COOLING FAN.

Application filed February 18, 1922. Serial No. 537,536.

*To all whom it may concern:*

Be it known that we, CARL LUTHER and HENRY MOELLER, citizens of the United States, residing at Council Bluffs, in the county of Pottawattamie and State of Iowa, have invented certain new and useful Improvements in Engine-Cooling Fans, of which the following is a specification, reference being had therein to the accompanying drawings.

The invention relates to cooling fans for internal combustion engines, and has for its object to provide a device of this character wherein the pitch of the fan blades automatically changes to their maximum pitch when the engine is running slowly, and to their minimum upon high speed of the engine. It has been found, especially in slow running engines, as for instance, tractor engines, that the engine heats on low speed and that on high speed the movement of the tractor or vehicle in combination with the cooling action of the fan is sufficient to cool the engine, which is not true where the engine is running slowly, at which time a maximum pitch of the fan blades will have the maximum cooling action on the engine.

A further object is to provide a cooling fan for engines comprising a hub member having a plurality of radially disposed chambers therein having spirally arranged ribs, which engage spirally arranged grooves in discs carried by the fan blades arms, which extend into the chambers through adjustable bushings and coiled springs interposed between the discs and the bushings and adapted to be compressed by the discs incident to the centrifugal force of the fan blades during the rotation of the hub. The spiral ribs and grooves forming means whereby the fan blades will be moved and the pitch thereof reduced during the high speed of the engine.

A further object is to provide circumferential adjustment of the fan blades on the fan arms, thereby allowing the pitch of the fan blades to be varied, and accurately adjusted.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the fan.
Figure 2 is a top plan view.
Figure 3 is a horizontal sectional view through the hub of the fan.
Figure 4 is a vertical sectional view through the hub of the fan.
Figure 5 is a vertical transverse sectional view taken on line 5—5 of Figure 4.
Figure 6 is a detail sectional view through one of the fan blades taken on line 6—6 of Figure 1.

Referring to the drawings, the numeral 1 designates the hub of the fan, which hub is rotatably mounted on a supporting shaft 2, which is threaded at 3 into a support 4, which support may be a portion of the engine. Extending rearwardly from the hub 1 is a drive pulley 5, which is adapted to be belted to the crank shaft of the engine or to any other portion thereof in the usual manner. It has been found that internal combustion engines, particularly those used in connection with tractors and farm implements when running slowly rapidly become heated and that the maximum cooling action is desired at this time, rather than when an engine is running fast, consequently being cooled to a greater degree by the movement of the vehicle and the rapid rotation of the fan. To obtain a maximum cooling action of the fan when the engine is running slowly, it is obvious that the fan blade 6 must be at a maximum pitch. However a maximum pitch, for instance forty-five degrees would not be a desirable pitch when the engine is operated at high speed on account of the strain on the fan belt and the power required to operate the fan. To accomplish the above result the fan blade arms 7 extend into radially disposed chambers 8 of the hub 1 of the fan and are provided with discs 9 having spiral grooves 10, which grooves receive spirally arranged ribs 11 in the inner periphery of the chambers 8. The discs 9 are held in the bottoms of the chambers 8 by means of the coiled springs 12, which surround the arms 7 and are interposed between the discs and the removable bushings 13 threaded in the outer ends of the chambers 8. It will be seen that by adjusting the bushings 13 inwardly or outwardly that the tension of the springs 12 may be varied. As the fan rotates when the engine is operated slowly, the springs 12 prevent outward movement of the discs 9, and as the blades 6 are set at their maximum pitch, for instance at forty-five degrees, it will be seen that a maximum cooling action will be obtained on the engine, however as the engine increases in speed the centrifugal force will overcome the expansive action of the coiled springs 12, thereby causing the fan arms 7 to move outwardly and during their outward movement the spiral ribs 11 will cause the discs 9 to partially rotate thereby reducing the pitch of the fan blades 6 and consequently requiring less power to operate the fan, at the same time securing sufficient cooling action for cooling the engine.

Each blade 6 has secured thereto by means of rivets 14 a sleeve 15, which sleeve is provided with an arcuate slot 16, through which the set screw 17 extends, said set screw being threaded into a fan arm 18. By loosening the screw 17, the fan blade 6 may be adjusted to any pitch desired, after which the set screw 17 may be tightened, thereby holding the blade in adjusted position. By providing the blade adjustment, it is obvious that the blades may be properly adjusted in relation to each other particularly for normal operation of the fan under slow speed of the engine.

From the above it will be seen that an adjustable pitch fan is provided for cooling engines wherein the pitch will vary according to the speed of rotation of the fan, and that the maximum pitch is obtained during low speed of the engine and fan, at which time a maximum cooling action is desired.

The invention having been set forth what is claimed as new and useful is:—

1. An adjustable pitch cooling fan for internal combustion engines, said fan comprising a hub having radially disposed chambers, radially disposed fan arms extending outwardly from said chambers, fan blades carried by said fan arms, discs on the inner ends of said fan arms, spirally arranged ribs carried in the chamber and engaging spirally arranged grooves in the discs, bushings threaded in the outer ends of the chambers and coiled springs surrounding the fan arms and interposed between the discs and the bushings.

2. An adjustable pitch cooling fan for internal combustion engines, said fan comprising a hub having radially disposed chambers, radially disposed fan arms extending outwardly from said chambers, fan blades carried by the fan arms, means for adjusting said fan blades circumferentially on the fan arms, connections between the fan arms and the hub whereby upon an outward movement of the fan arms, they will be partially rotated and spring means for normally holding said fan arms in inner position upon slow rotation of the fan.

In testimony whereof we hereunto affix our signatures.

CARL LUTHER.
HENRY MOELLER.